March 24, 1953     L. C. WALES     2,632,625
WATER WHEEL
Filed April 24, 1947     3 Sheets-Sheet 1
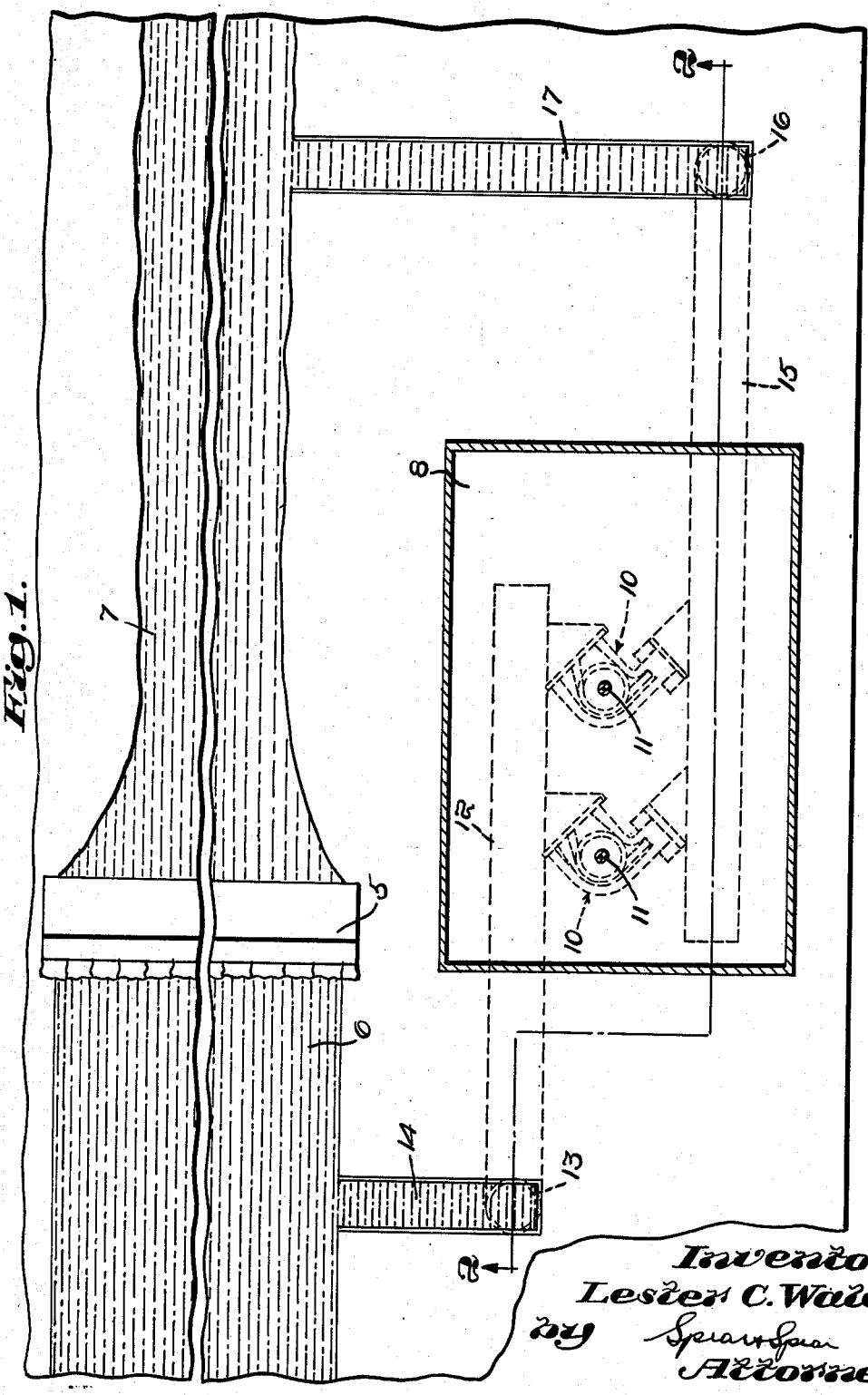
Inventor:
Lester C. Wales

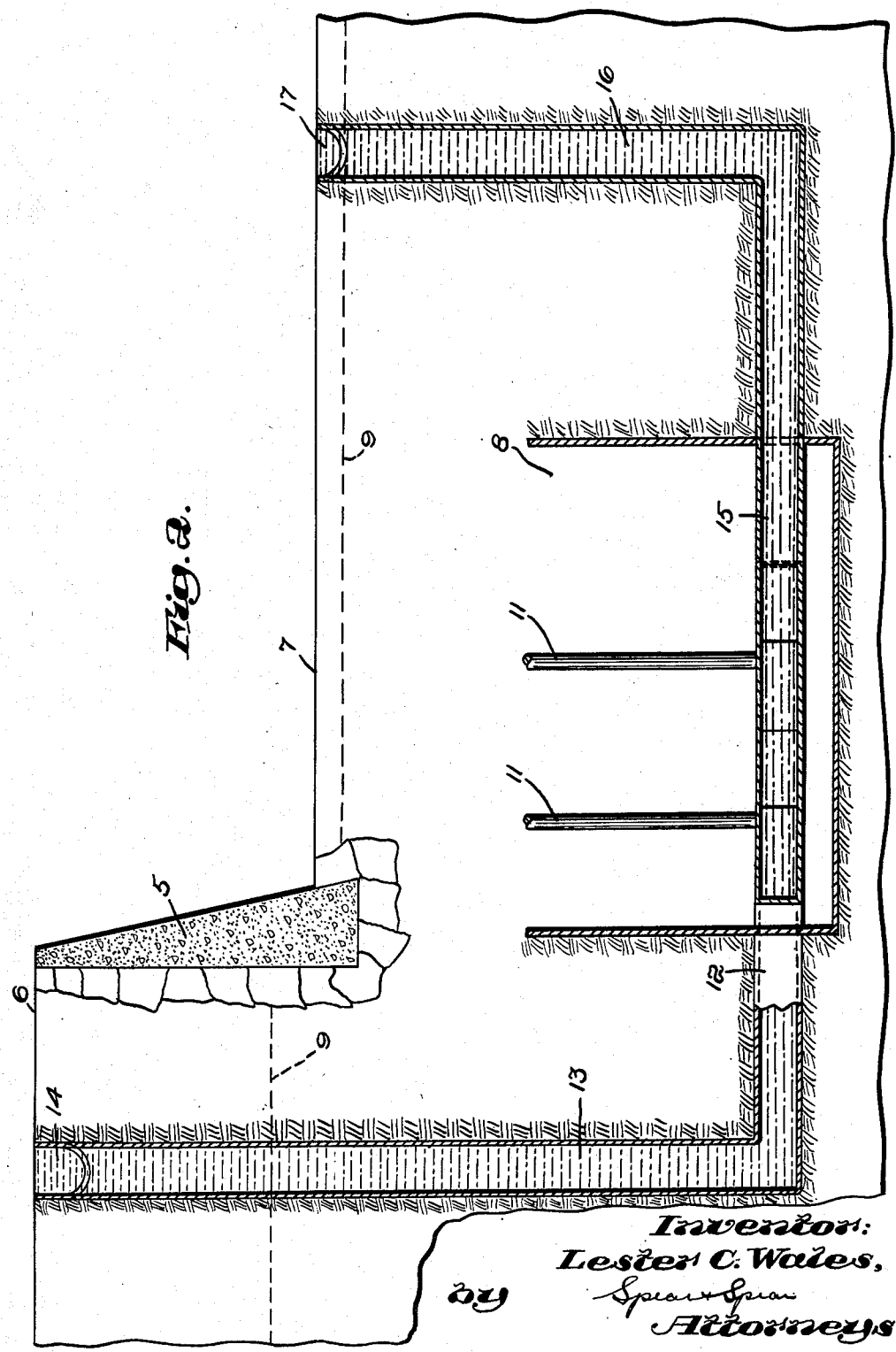

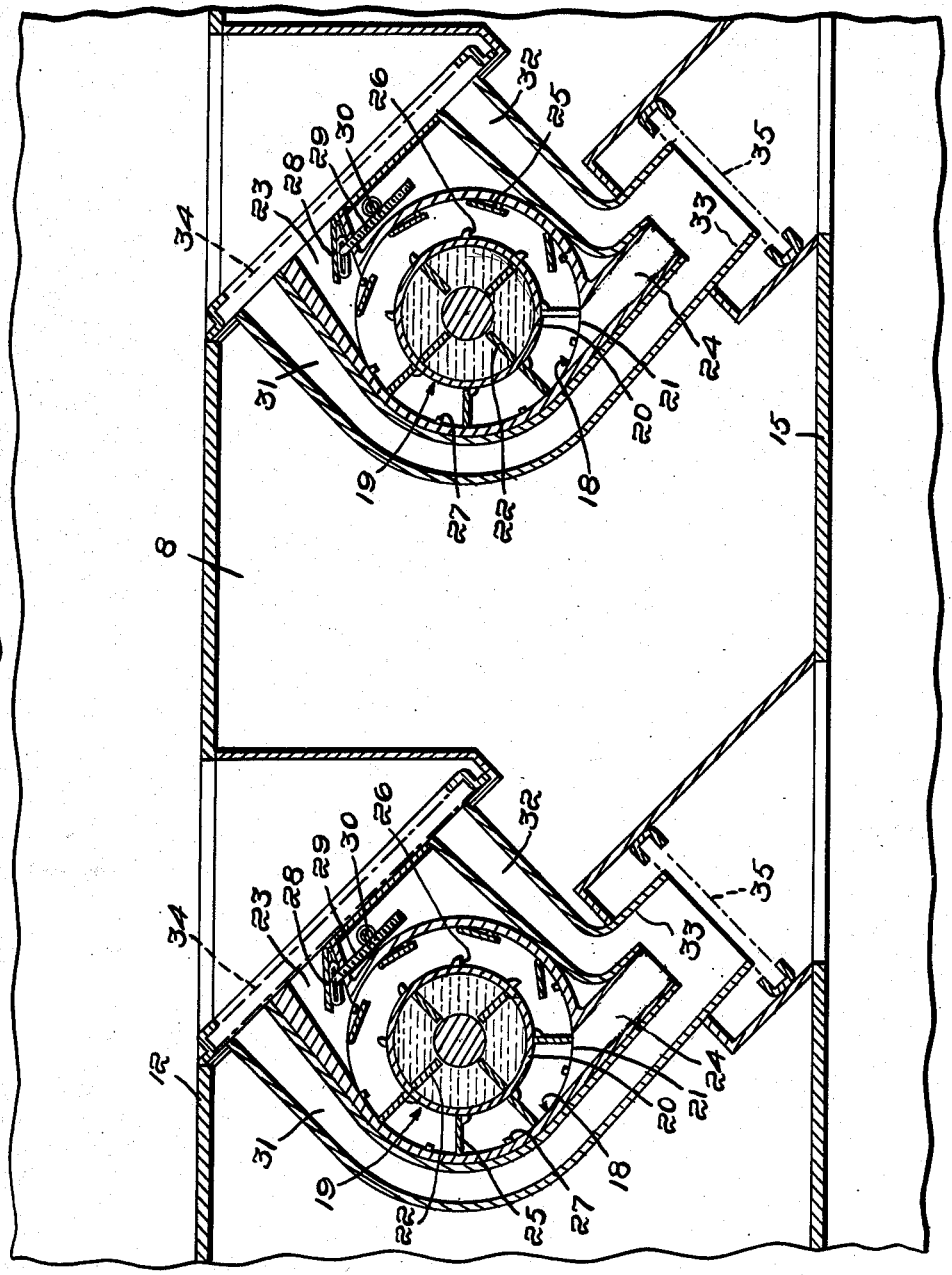

Patented Mar. 24, 1953

2,632,625

UNITED STATES PATENT OFFICE 2,632,625

WATER WHEEL

Lester C. Wales, Portland, Maine

Application April 24, 1947, Serial No. 743,670

1 Claim. (Cl. 253—17)

My present invention relates to water wheels adapted to operate efficiently with a substantial head of tail water and to dam structures incorporating such a wheel.

In accordance with my invention I provide a dam structure with a wheel disposed below the bottom of the water course in the zone of the dam. The wheel, which may be of any type but is preferably the wheel disclosed in my co-pending application, Serial No. 716,349, filed December 14, 1946, now Patent No. 2,608,379, dated August 26, 1952, includes an inlet and an outlet with a substantially increased head existing on its inlet side and a head existing on its outlet side due to the fact that it is positioned below the bottom of the dammed water course. In such a structure, I bypass water about the water wheel to establish a discharge jet in such relation to the water wheel outlet as to minimize the effect of the head of the tail water on the water wheel so that the advantages of the increased head on its inlet side may be utilized.

In the accompanying drawings I have shown an illustrative embodiment of my invention from which its novel features and advantages will be readily apparent.

In the drawings:

Fig. 1 is a fragmentary plan view of a dam structure in accordance with my invention.

Fig. 2 is a section along the lines 2—2 of Fig. 1, and

Fig. 3 is a horizontal section on an enlarged scale of the penstocks and water wheels to show the preferred water wheel construction.

At 5, I have suggested a dam of any desired type in a water course establishing a pond 6 and tail water indicated at 7.

In accordance with my invention, I provide a pit 8 extending a substantial distance below the river bottom 9 in the zone of the dam 5. In the pit 8, I locate one or more water wheels 10, the shafts 11 of which are shown as vertically disposed where the machine room, not shown, extends over the pit. As indicated in Figs. 1 and 2, a penstock 12 is in communication with the inlets of the wheels 10 and includes a riser portion 13 in communication with the canal 14 which is open to the pond 6. Where the pit 8 is located downstream from the dam 5, it may be advantageously spaced from the tail water 7 and I have shown a second penstock 15 in communication with the wheel outlets and including a riser 16 to discharge water into the canal 17 and thence to tail water.

While any type of water wheel may be used, provided pond water is bypassed around and discharged as a jet to offset or minimize the effect of the tail water head on its outlet side, I prefer to use the water wheel, the details of which may be most clearly seen in Fig. 3.

The water wheel, shown in the drawings, is of the type disclosed in my co-pending application, Serial No. 716,439, filed December 14, 1946, and while I have not detailed its construction, such a wheel may consist of a casing generally indicated at 18 and having a wheel chamber 19 therein. Fast on the shaft 11 within the wheel chamber 19 is a hub or drum 20 which may be filled with water ballast and includes circular end walls 21. Preferably, the interior of the drum 20 is subdivided by blades 22 extending radially inwardly but spaced from the shaft 11.

In Fig. 3, I have indicated at 23 an inlet conduit in communication with the inlet penstock 12 and at 24 the outlet conduit in communication with the outlet penstock 15. These are so disposed relative to each other and to the wheel chamber 19 that water tends to flow around the hub 20 in a predetermined direction. The inlet 23 and the outlet 24 are preferably tapered with their zones of minimum cross sectional area being adjacent the wheel chamber 19.

Adjacent the periphery of the end walls 21, I pivotally mount a plurality of spaced blades 25 to swing under the influence of water circulating in the predetermined direction into an operative position in which they seat against stops 26 on the hub 20 to obstruct the flow of water through the wheel chamber. The blades 25 are swung outwardly against stops 27 by water tending to circulate about the hub in an opposite direction thereby to enable such water to circulate in that direction without retarding the action of the water wheel. The inlet 23 may be provided with a flow regulator 28, if desired, adjustable by the member 29 threaded through the wall of the inlet 23 and rotatable as by the worm shaft 30.

In accordance with my present invention, I provide each of my water wheels with one and preferably a plurality of bypass conduits. In the drawings I have shown two such conduits at 31 and 32 both in communication with the inlet penstock 12 and both having their outlets extending slightly beyond the outlet 24 of the wheel chamber 19 as at 33 and in such relation thereto that a discharge jet is provided which offsets the head of water on the wheel outlet 24. Preferably the bypass conduits 31 and 32 taper towards their outlet ends. I have indicated gates 34 and 35 to close all the inlets and all the outlets, respectively, so that each wheel may be serviced without water flowing thereto.

In accordance with my invention, I provide water wheels that are of great advantage since they are capable of operating efficiently with a head on their outlets so that they may be positioned in pits a substantial distance below the bed of the water course, thereby to establish a greatly increased head on the inlet side of the water wheel without the heavy expense entailed in building a dam structure to provide such a head.

What I therefore claim and desire to secure by Letters Patent is:

A water wheel for use where a tail water head exists comprising a casing, a hub member rotatably mounted within said casing, a water inlet and a water outlet conduit in communication with the interior of said casing and disposed so that water passing from said inlet to said outlet tends to flow about said hub in a predetermined direction, a plurality of blades, means carried by said hub pivotally supporting said blades at their outer edge so that each blade may be swung by a stream of water flowing in that direction into a position intersecting and substantially blocking said stream and swung away from that position into an inoperative position by water seeking to flow about said hub in the opposite direction, and at least one bypass conduit having its inlet adjacent said water inlet and including an outlet conduit surrounding and extending beyond said wheel outlet conduit to provide a discharge jet substantially parallel to the stream of water through the wheel outlet conduit and relieving said water wheel of back pressure.

LESTER C. WALES.

REFERENCES CITED

The following references are of record in the file of this patent:

UNITED STATES PATENTS

| Number | Name | Date |
| --- | --- | --- |
| 227,576 | Read | May 11, 1880 |
| 840,110 | Coburn | Jan. 1, 1907 |
| 1,487,391 | Kochlin | Mar. 18, 1924 |
| 1,517,916 | Moody | Dec. 2, 1924 |
| 1,661,872 | Branington | Mar. 6, 1928 |
| 1,681,711 | Taylor | Aug. 21, 1928 |
| 1,977,036 | Biggs | Oct. 16, 1934 |